United States Patent
Hayashi et al.

(10) Patent No.: US 8,398,390 B2
(45) Date of Patent: Mar. 19, 2013

(54) DIE FOR FORMING HONEYCOMB STRUCTURE

(75) Inventors: Seiichiro Hayashi, Nagoya (JP); Takashi Matsukubo, Ogaki (JP); Takao Saito, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 318 days.

(21) Appl. No.: 12/703,307

(22) Filed: Feb. 10, 2010

(65) Prior Publication Data
US 2010/0209546 A1 Aug. 19, 2010

(30) Foreign Application Priority Data
Feb. 18, 2009 (JP) ................. 2009-035219

(51) Int. Cl.
*B29C 47/12* (2006.01)
(52) U.S. Cl. ............... 425/192 R; 264/177.12; 425/380; 425/467
(58) Field of Classification Search .............. 425/192 R, 425/380, 467; 264/177.12
See application file for complete search history.

(56) References Cited

U.S. PATENT DOCUMENTS

| | | | | |
|---|---|---|---|---|
| 3,790,654 A | * | 2/1974 | Bagley | 264/177.11 |
| 4,333,896 A | * | 6/1982 | Cunningham | 264/40.5 |
| 4,486,934 A | * | 12/1984 | Reed | 76/107.1 |
| 5,238,386 A | * | 8/1993 | Cunningham et al. | 425/192 R |
| 2005/0118296 A1 | | 6/2005 | Kaneko et al. | |
| 2006/0088621 A1 | * | 4/2006 | Matsuoka et al. | 425/382 R |
| 2008/0113858 A1 | | 5/2008 | Kaneko et al. | |
| 2009/0061040 A1 | | 3/2009 | Hayashi et al. | |

FOREIGN PATENT DOCUMENTS

| | | |
|---|---|---|
| JP | 10-315213 A1 | 12/1998 |
| JP | 2000-326318 A1 | 11/2000 |
| JP | 2003-285308 A1 | 10/2003 |
| JP | 2008-149595 A1 | 7/2008 |
| WO | WO 2008/078644 * | 7/2008 |

\* cited by examiner

*Primary Examiner* — Yogendra Gupta
*Assistant Examiner* — Joseph Leyson
(74) *Attorney, Agent, or Firm* — Burr & Brown (57) ABSTRACT

A die for forming the honeycomb structure includes: a plate-like die main body including an introducing portion provided on the side of one surface thereof and having a plurality of back holes and a forming portion provided on the side of the other surface thereof and having slits; and a back plate detachably attached to the surface of the introducing portion and having a plurality of through holes connected to the back holes of the introducing portion. Through hole opening portions of the through holes formed in the back plate in the one surface of the die main body have such an enlarging shape as to enlarge toward the one surface of the die main body. The die for forming the honeycomb structure can decrease the resistance of a forming material during extrusion.

9 Claims, 3 Drawing Sheets

DIE FOR FORMING HONEYCOMB STRUCTURE

BACKGROUND OF THE INVENTION

1. Field of the Invention

The present invention relates to a die for forming a honeycomb structure. More particularly, it relates to a die for forming a honeycomb structure, which can decrease the resistance of a forming material in an extruding direction thereof during extrusion and which can decrease the resistance of the outward flow of the forming material in the outer peripheral portion of the surface of the die on a forming material introduction side during the extrusion.

2. Description of the Related Art

As a manufacturing method of a ceramic honeycomb structure, there has heretofore broadly been performed an extrusion method using a die for forming a honeycomb structure, provided with back holes for introducing a forming material (a clay) and slits provided in a lattice-like pattern or the like so as to communicate with the back holes. This die usually has one surface (an introduction surface) including an introducing portion in which a plurality of back holes having large open areas are formed, and has the opposite surface (the other surface) including a forming portion in which slits each having a width corresponding to the thickness of each partition wall of the honeycomb structure are provided in a lattice-like pattern or the like. Moreover, the back holes are usually provided at positions corresponding to the intersections of the lattice-like slits, and are connected to the slits inside the die. Therefore, a forming material such as a ceramic material introduced through the back holes moves from the back holes having comparatively large inner diameters to the slits having small widths, and is extruded through the opening portions of the slits to obtain a formed honeycomb article.

As such a die for forming the honeycomb structure, for example, a plate-like member made of one type of alloy such as a stainless steel alloy or a hard metal or a plate-like member formed by bonding two different types of plate-like members is used (e.g., see Patent Documents 1 to 3).

However, the die for forming the honeycomb structure has concave/convex portions in the introduction surface thereof. In the introduction surface of the die, there are fluctuations in these concave/convex portions, and hence fluctuations are generated in the flow properties of the clay, thereby causing a problem of forming properties, especially the forming properties of an outer wall. Moreover, the concave/convex shape of the die changes owing to wear on the die, thereby also causing a problem that the fluctuations of the flow properties also change. To solve the problems, there is suggested a die for forming a honeycomb structure, having an introduction surface to which a back plate provided with a plurality of through holes connected to the back holes of the introducing portion is detachably attached, and the back plate has a diamond-like carbon film (a DLC film) on the surface thereof (e.g., see Patent Document 4).

[Patent Document 1] JP-A-2000-326318
[Patent Document 2] JP-A-2003-285308
[Patent Document 3] JP-A-10-315213
[Patent Document 4] JP-A-2008-149595

The die for forming the honeycomb structure disclosed in Patent Document 4 is excellent in honeycomb structure forming properties and a wear resistance, but room for investigation has been left from the viewpoint of the resistance of the forming material during the extrusion.

SUMMARY OF THE INVENTION

The present invention has been developed in view of the above problems, and an object thereof is to provide a die for forming a honeycomb structure, which can decrease the resistance a forming material in the extruding direction thereof during extrusion and which can decrease the resistance of the outward flow of the forming material in the outer peripheral portion of the surface of the die on a forming material introduction side during the extrusion.

To achieve the above object, according to the present invention, a die for forming a honeycomb structure is provided as follows.

According to a first aspect of the present invention, the die for forming a honeycomb structure, includes a plate-like die main body having an introducing portion provided on the side of one surface thereof and having a plurality of back holes extending in a thickness direction to introduce a forming material and a forming portion provided on the side of the other surface thereof and having slits connected to the back holes to form the forming material into a honeycomb shape; and a back plate detachably (i.e., removably) attached to the surface of the introducing portion and having a plurality of through holes connected to the back holes of the introducing portion, wherein the opening portions of the through holes formed in the back plate in the one surface of the die main body have such an enlarging shape as to enlarge toward the one surface of the die main body.

According to a second aspect of the present invention, the die for forming the honeycomb structure according to the first aspect is provided, wherein the outermost peripheral portions of the opening portions of the adjacent through holes come in contact with each other.

According to a third aspect of the present invention, the die for forming the honeycomb structure according to the first or second aspects is provided, wherein the enlarged portions of the opening portions of the through holes having the enlarging shape have a surface roughness, Ra, of 0.005 to 5 µm.

According to a fourth aspect of the present invention, the die for forming the honeycomb structure according to any one of the first to third aspects is provided, wherein a depth between the surface of the back plate which does not come in contact with the die main body and the center of the contact portion of the outermost peripheral portions of the opening portions of the adjacent through holes is from 20 to 150 µm.

According to a fifth aspect of the present invention, the die for forming the honeycomb structure according to any one of the first to fourth aspects is provided, wherein the surface of the back plate has a diamond-like carbon film.

According to the die for forming the honeycomb structure of the present invention, the opening portions of the through holes formed in the back plate have the enlarging shape, and hence the resistance of the forming material flowing into the through holes decreases, which makes it possible to decrease a resistance in an extruding direction during extrusion. Moreover, the opening portions of the through holes formed in the outer peripheral portion of the back plate have the enlarging shape, and hence the resistance of the forming material moving to the outside of the surface of the outer peripheral portion of the back plate (the resistance of the forming material flowing along the surface of the back plate) decreases, which makes it possible to decrease the resistance of the outward flow of the forming material in the outer peripheral portion of the surface of the back plate during the extrusion.

DESCRIPTION OF THE PREFERRED EMBODIMENT

Hereinafter, a mode for carrying out the present invention will specifically be described with reference to the drawings. It should be understood that the present invention is not limited to the following embodiment and that the appropriate alternation, improvement or the like of design is added to the present invention based on the ordinary knowledge of a person with ordinary skill without departing from the scope of the present invention.

Figure 1:
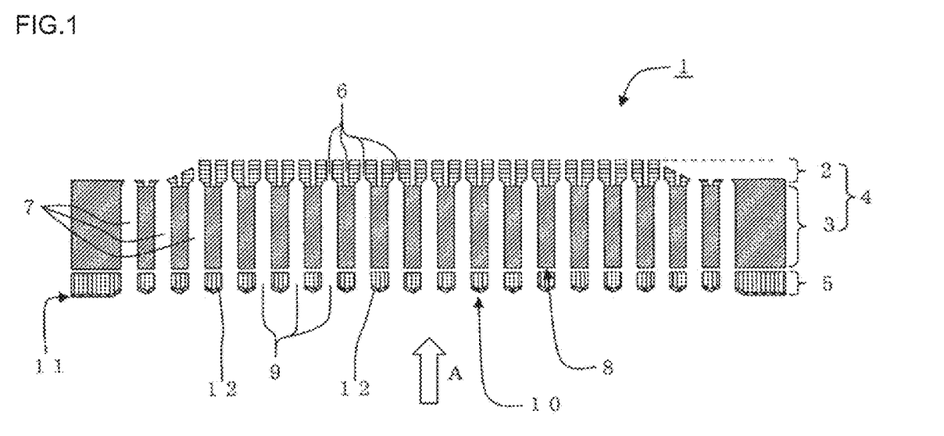
FIG. 1 is a schematic sectional view cut along a direction parallel to a back hole extending direction in one embodiment of a die for forming a honeycomb structure of the present invention.

FIG. 1 is a schematic sectional view cut along a direction parallel to a back hole extending direction (a forming material flow direction) in one embodiment of a die for forming a honeycomb structure of the present invention. In FIG. 1, arrow A is the flow direction of the forming material. As shown in FIG. 1, a honeycomb structure forming die 1 of the present embodiment includes a plate-like die main body 4 having an introducing portion 3 provided on the side of one surface thereof (an introduction surface 8) and having a plurality of back holes 7 extending in a thickness direction to introduce the forming material and a forming portion 2 provided on the side of the other surface thereof and having slits 6 connected to the back holes 7 to form the forming material into a honeycomb shape; and a back plate 5 detachably attached to the surface of the introducing portion 3 (the introduction surface 8) and provided with a plurality of through holes 9 connected to the back holes 7 of the introducing portion 3. Opening portions 12 of the through holes 9 formed in the back plate 5 in the one surface of the die main body (a back plate introduction surface 10) have such an enlarging shape as to enlarge toward the one surface of the die main body (the back plate introduction surface 10). Moreover, in the honeycomb structure forming die 1 of the present embodiment, the surface of the back plate 5 has a diamond-like carbon film (a DLC film 11). According to the honeycomb structure forming die 1 of the present embodiment, the forming material passed from the back plate introduction surface 10 through the through holes 9 and introduced into the introducing portion 3 through the back holes 7 can be formed into a honeycomb shape through the slits 6 of the forming portion 2. The obtained honeycomb structure includes partition walls formed to define a plurality of cells extending in a central axis direction; and an outer peripheral wall provided to surround all of the partition walls. Here, the back plate introduction surface 10 is the surface of the back plate 5 which does not come in contact with the die main body 4.

The slits 6 are preferably formed in a lattice-like pattern in the surface of the main body vertical to the flow direction of the forming material, and the back holes 7 are preferably provided at positions corresponding to the intersections of the slits 6 formed in the lattice-like pattern or the like. It is to be noted that the slits 6 may be provided so as to extend from the forming portion 2 to a part of the introducing portion 3 and that the back holes 7 may be formed in the introducing portion 3 so as to communicate with the slits 6. Conversely, the back holes 7 may be provided so as to extend from the introducing portion 3 to a part of the forming portion 2, and the slits 6 may be formed so as to communicate with the back holes 7. Moreover, FIG. 1 shows that the die main body 4 is separated from the back plate 5, but during use, the die main body 4 is brought into contact with the back plate 5.

Figure 2:
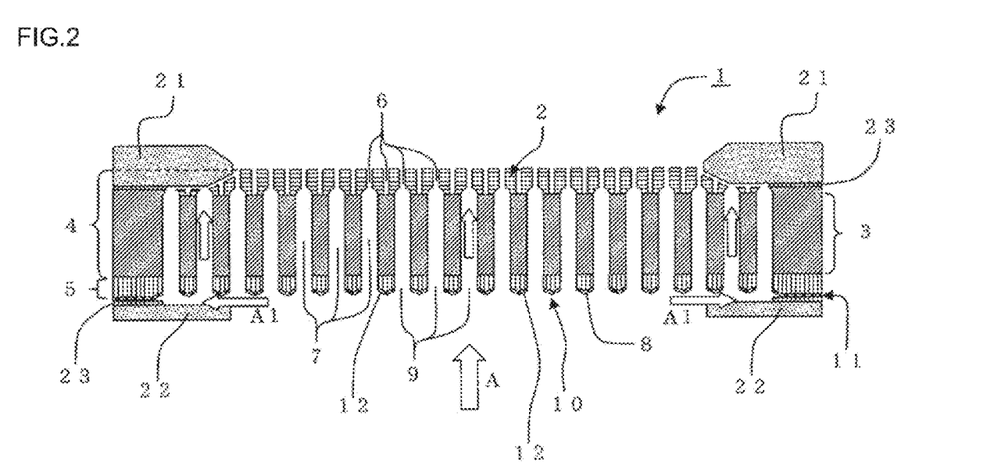
FIG. 2 is a schematic sectional view cut along the direction parallel to the back hole extending direction in a state in which the embodiment of the die for forming the honeycomb structure of the present invention is fixed by a masking plate at the tip portion of an extruder.

In this way, the opening portions 12 of the through holes 9 formed in the back plate 5 has the enlarging shape, which can decrease the resistance of the forming material flowing into the through holes 9 and which can decrease the resistance of the forming material in the extruding direction thereof during the extrusion. That is, in a case where a pressure loss generated by the extrusion of the forming material is considered, the pressure loss includes an inlet loss which depends on the shape of the through hole opening portions 12, a frictional loss between the back holes 7 and the forming portion 2 and an outlet loss which depends on the shape of the forming portion 2. When the dimensions or shapes of the back holes 7 and forming portion 2 are fixed, the loss is influenced by the shape of the through hole opening portions 12. In general, it is known that in a case where a loss coefficient is 1.0 when the opening portions do not have the enlarging shape, the coefficient becomes 0.5 in the case of an ideal bell mouth shape, and the effect of the bell mouth shape can be obtained by the shape of the through hole opening portions 12 at low cost. Moreover, if the surfaces of the opening portions are flat, the forming material resides therein. In consequence, a flow interface is formed between the residing forming material and the newly flowing forming material, and a resistance in the interface is usually higher than a resistance between a metal and the forming material, whereby the resistance increases. Moreover, the opening portions 12 of the through holes 9 formed in the outer peripheral portion of the back plate 5 have the enlarging shape, which can decrease the resistance of the forming material moving to the outside of the surface of the outer peripheral portion of the back plate 5 (the resistance of the forming material flowing along the surface of the back plate 5) and which can decrease the resistance of the outward flow of the forming material in the outer peripheral portion of the surface of the back plate 5 during the extrusion. That is, when the forming material flows outwardly, the thicknesses of spacers 23 shown in FIG. 2 are regions where the material flows, but the opening portions enlarge, and hence the thicknesses of the regions are actually larger than those of the spacers, which lowers the flow resistance. In this way, the resistance of the flow of the forming material can be decreased to suppress the generation of "hangnails" in the surface of the formed honeycomb structure or the generation of pores in the partition walls and outer peripheral wall of the honeycomb structure. In particular, if the resistance of the flow of the forming material suddenly increases, "the hangnails" or the pores are easily generated, but according to the die for forming the honeycomb structure of the present embodiment, such a sudden fluctuation of the flow resistance can be decreased. If the flow resistance of the forming material increases, the pressure loss of the flow of the forming material increases, whereby according to the die for forming the honeycomb structure of the present embodiment, the pressure loss of the flow of the forming material can be decreased. Here, the resistance in the extruding direction during the extrusion and the resistance of the forming material moving in the outer peripheral direction of the surface of the back plate 5 are generically referred to as "the flow resistance of the forming material" sometimes. Moreover, "the hangnails" indicate the cut state of the outer peripheral wall of the honeycomb structure, and the pores indicate pores opened in the outer peripheral wall of the structure and having opening diameters of about 100 to 800 μm and depths of about 200 to 800 μm.

The back plate 5 of the honeycomb structure forming die 1 of the present embodiment is a plate-like member having a predetermined thickness, and has the surface provided with the plurality of through holes 9 extending in a vertical direction. Moreover, the surface of the back plate is also provided with the diamond-like carbon film (the DLC film 11).

In the honeycomb structure forming die 1 of the present embodiment, the enlarged portions of the through hole opening portions 12 formed in the back plate 5 and having the enlarging shape have a surface roughness of preferably 0.005 to 5 μmRa, further preferably 0.1 to 2.5 μm. The enlarged portions of the through hole opening portions 12 have the surface roughness in such a range, whereby the resistance of the flow of the forming material can be decreased. The surface roughness of the enlarged portions of the through hole opening portions 12 is preferably as small as possible, but it is difficult in the existing production technology (the mass production technology) to set the surface roughness to be smaller than 0.005 μmRa. Moreover, if the surface roughness of the enlarged portions of the through hole opening portions 12 is larger than 5 μmRa, the resistance of the flow of the forming material is not easily sufficiently decreased sometimes. The surface roughness of the enlarged portions of the through hole opening portions is a value measured by the method of JIS B601. Moreover, the surface roughness of the whole back plate introduction surface 10 is further preferably from 0.01 to 5 μmRa. Here, the through hole opening portions 12 are the portions of the through holes 9 tilted at an angle θ near the back plate introduction surface 10 (the portions of through hole opening surfaces 14). Moreover, the surfaces of the enlarged portions of the through hole opening portions 12 are referred to as "the through hole opening surfaces" 14 sometimes. The surface roughness of the enlarged portions of the through hole opening portions 12 corresponds to that of the through hole opening surfaces 14.

In the honeycomb structure forming die 1 of the present embodiment, the surface of the back plate 5 (including the through hole opening portions 12) has the diamond-like carbon film (the DLC film 11), but does not have to have the DLC film 11. When the DLC film 11 is formed on the surface of the back plate 5, the back plate 5 has a high wear resistance and hence can preferably be used for a long time of period. Even if the DLC film 11 is not formed on the surface of the back plate 5, the surface roughness can be decreased by a method such as plating or CVD. Moreover, the only surface of the back plate 5 may be coated with the DLC film, and the die main body 4 does not have to be coated, whereby coating can easily be performed. Furthermore, the back plate 5 is detachably attached to the introduction surface 8 of the die main body 4, and hence one back plate can be used for a plurality of dies.

The diamond-like carbon is also referred to as diamond carbon, hard carbon or amorphous carbon, and is a substance containing carbon as a main component and having an amorphous structure, which includes the $SP^3$ bond of carbon atoms similar to that of a natural diamond and the $SP^2$ bond of the carbon atoms similar to that of the graphite and which partially includes a bond with hydrogen. The diamond-like carbon film has high hardness, low wear properties, low friction properties and excellent surface smoothness.

The thickness of the DLC film 11 is preferably from 0.01 to 10 μm, further preferably from 0.1 to 5 μm, especially preferably from 1 to 3 μm. If the thickness is smaller than 0.01 μm, the smoothness and the wear resistance are not easily exerted. If the thickness is larger than 10 μm, the DLC is wasted.

Figure 3:
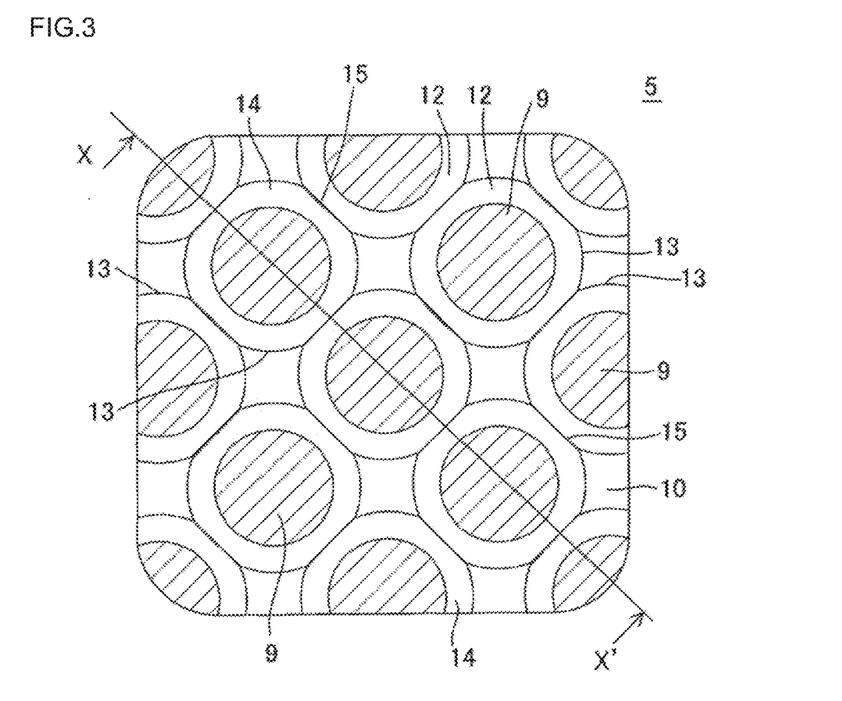
FIG. 3 is a plan view of a part of a back plate of the embodiment of the die for forming the honeycomb structure of the present invention as seen from a back plate introduction surface side.
Figure 4:
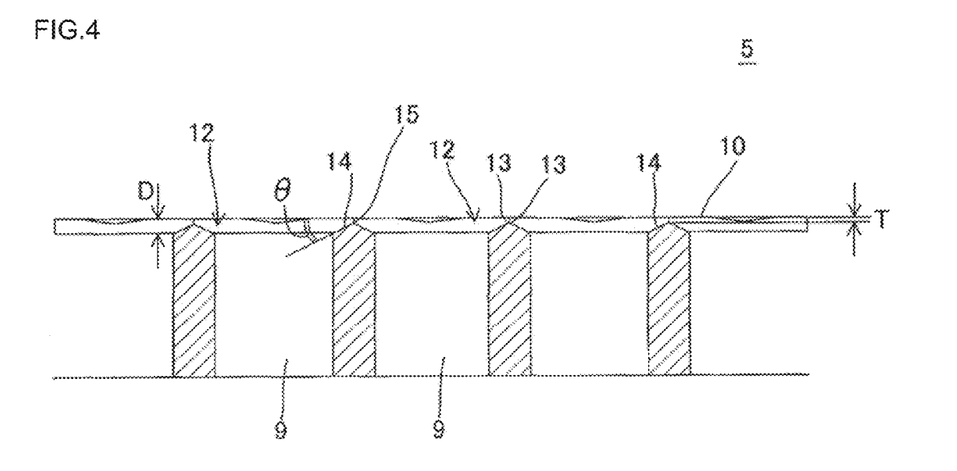
FIG. 4 is a schematic diagram showing a cross section cut along the line X-X' of FIG. 3.

As shown in FIGS. 3, 4, in the back plate 5 of the die for forming the honeycomb structure of the present invention, outermost peripheral portions 13 of the through hole opening portions 12 of the adjacent through holes 9 preferably come in contact with each other. Since the outermost peripheral portions 13 of the through hole opening portions 12 of the adjacent through holes 9 come in contact with each other, the resistance of the forming material flowing into the through holes 9 of the back plate 5 can be decreased, and the resistance of the forming material moving along the back plate introduction surface 10 of the back plate 5 can be decreased. FIG. 3 is a plan view of a part of the back plate 5 of the embodiment of the die for forming the honeycomb structure of the present invention as seen from a back plate introduction surface 10 side. FIG. 4 is a schematic diagram showing a cross section cut along the line X-X' of FIG. 3. It is to be noted that the back plate shown in FIGS. 3 and 4 is not provided with any DLC film.

Moreover, an acute angle θ formed by the through hole opening surface 14 of the through hole opening portion 12 and a plane parallel to the back plate introduction surface 10 as shown in FIG. 4 is preferably from 15 to 60°, further preferably from 20 to 45°. When the angle θ is in such a range, the flow resistance of the forming material can be decreased, and the wear on the back plate can be decreased. If the angle θ is smaller than 15°, the effect of decreasing the flow resistance of the forming material decreases sometimes. If the angle θ is larger than 60°, the wear on the back plate increases sometimes. As shown in FIG. 4, the through hole opening surface 14 of the through hole opening portion 12 is preferably linear in a cross section thereof parallel to the extending direction of each through hole (the circulating direction of the forming material), but the present invention is not limited to this example, and the through hole opening surface may have an outwardly convex circular shape or an inwardly depressed circular shape.

Furthermore, a depth D of the through hole opening portion 12 having an enlarging shape is preferably from 50 to 1,300 further preferably from 100 to 1,200 μm. When the depth D is in such a range, the effect of decreasing a forming pressure loss is exerted. If the depth D is smaller than 50 μm, the effect of decreasing the flow resistance of the forming material decreases sometimes. If the depth is larger than 1,300 μm, the structure becomes brittle, and durability lowers sometimes. In addition, a depth T between the back plate introduction surface (the surface of the back plate) and the center of a contact portion 15 of the outermost peripheral portions 13 of the through hole opening portions 12 of the adjacent through holes 9 is preferably from 20 to 150 μm, further preferably from 30 to 100 μm. When the depth T is in such a range, the effect of decreasing the defects of an outer wall of a formed article is exerted. If the depth T is smaller than 20 μm, the effect of decreasing the flow resistance of the forming material decreases sometimes. If the depth is larger than 150 μm, the resistance of the outwardly flowing material remarkably lowers, and a balance between the forming speeds of the partition walls of the honeycomb structure and the outer wall thereof breaks down, thereby incurring the deformation of the partition walls sometimes. "The center of the contact portion 15 of the outermost peripheral portions 13" is the center point of a ridgeline formed at a position where the outermost peripheral portions 13 come in contact with each other. It is to be noted that the depth D and the depth T are measured values in a case where the back plate is provided with the DLC film and the surface of the DLC film is considered to be the surface of the back plate.

FIG. 2 is a schematic sectional view cut along the direction parallel to the back hole extending direction in a state in which the embodiment of the die for forming the honeycomb structure of the present invention is fixed by a masking plate at the tip portion of an extruder. In FIG. 2, the other part of the extruder is omitted. In FIG. 2, the honeycomb structure forming die 1 is disposed so that the forming portion 2 faces the downstream side (the introducing portion 3 faces the upstream side), and is sandwiched and fixed between a regulation ring 22 positioned on the upstream side and a ring-shaped masking plate 21 positioned on the downstream side via spacers 23. Here, the upstream side is the upstream side of the forming material in the flow direction (the extruding direction) thereof, and the downstream side is the downstream side of the forming material in the flow direction (the extruding direction) thereof.

As shown in FIG. 2, when the forming material is caused to flow in a flow direction A, and is introduced into the honeycomb structure forming die 1, a large part of the forming material is introduced into the introducing portion 3 through the back holes 7 as it is, moves to the slits 6 having small widths and is extruded as a formed honeycomb article through the opening portions of the slits. Then, a part of the forming material enters a gap between the honeycomb structure forming die 1 and the regulation ring 22 as shown by a flow (a lateral flow) A1 of the forming material, passes through the gap, is introduced through the back holes 7, and is extruded to the outside of a gap between the masking plate 21 and the forming portion 2. At this time, the forming material extruded from the gap between the masking plate 21 and the forming portion 2 forms the outer peripheral wall of the honeycomb structure.

When the flow A1 of the forming material shown in FIG. 2 moves from the outer peripheral portion of the surface of the back plate to the outside thereof and the resistance of the flow A1 of the forming material (the resistance of the forming material flowing along the surface of the back plate) is large, "the hangnails" or the pores are unfavorably formed in the outer peripheral wall sometimes. In the die for forming the honeycomb structure of the present embodiment, the through hole opening portions of the back plate have such an enlarging shape as to enlarge toward the surface of the back plate (the back plate introduction surface), whereby the resistance of the flow A1 of the forming material can be decreased. Here, the outer peripheral portion of the back plate is a region thereof which overlaps with the regulation ring 22 as shown in FIG. 2.

The surface of the honeycomb structure forming die 1 of the present embodiment, through which the forming material is introduced, corresponds to the back plate introduction surface 10, and hence has a high wear resistance because of the high wear resistance of the DLC film. For example, when the honeycomb structure forming die 1 of the present embodiment is disposed as shown in FIG. 2, usually during the extrusion, the back plate introduction surface 10 is easily worn especially by the flow A1 in a lateral direction. That is, the portion of the back plate introduction surface 10 which overlaps with the regulation ring 22 tends to be noticeably easily worn. If the wear occurs on this portion, the gap between the back plate introduction surface 10 and the regulation ring 22 becomes non-uniform and large, whereby the flow rate of the lateral flow A1, that is, the supply amount of the forming material for forming the outer peripheral wall of the honeycomb structure becomes non-uniform and large, thereby deforming the honeycomb structure. However, in the honeycomb structure forming die 1 of the present embodiment, the through hole opening portions of the back plate have such an enlarging shape as to enlarge toward the surface of the back plate (the back plate introduction surface), whereby the resistance of the flow A1 of the forming material decreases, and such wear can be suppressed. Moreover, if a conventional die for forming the honeycomb structure is used, the whole worn die needs to be replaced, or the worn introduction surface of the die needs to be reprocessed into a planar shape by grind processing or the like, but in the honeycomb structure forming die 1 of the present embodiment, the back plate 5 is only replaced. In consequence, the state of the honeycomb structure forming die 1 can easily and satisfactorily be maintained at low cost.

The thickness of the back plate 5 is preferably from 0.5 to 5 mm, further preferably from 1 to 3 mm. If the thickness is smaller than 0.5 mm, the back plate 5 is deformed or cracked sometimes during the extrusion. If the thickness is larger than 5 mm, the die for forming the honeycomb structure excessively thickens sometimes, whereby the pressure loss during the extrusion increases sometimes.

Figure 5:
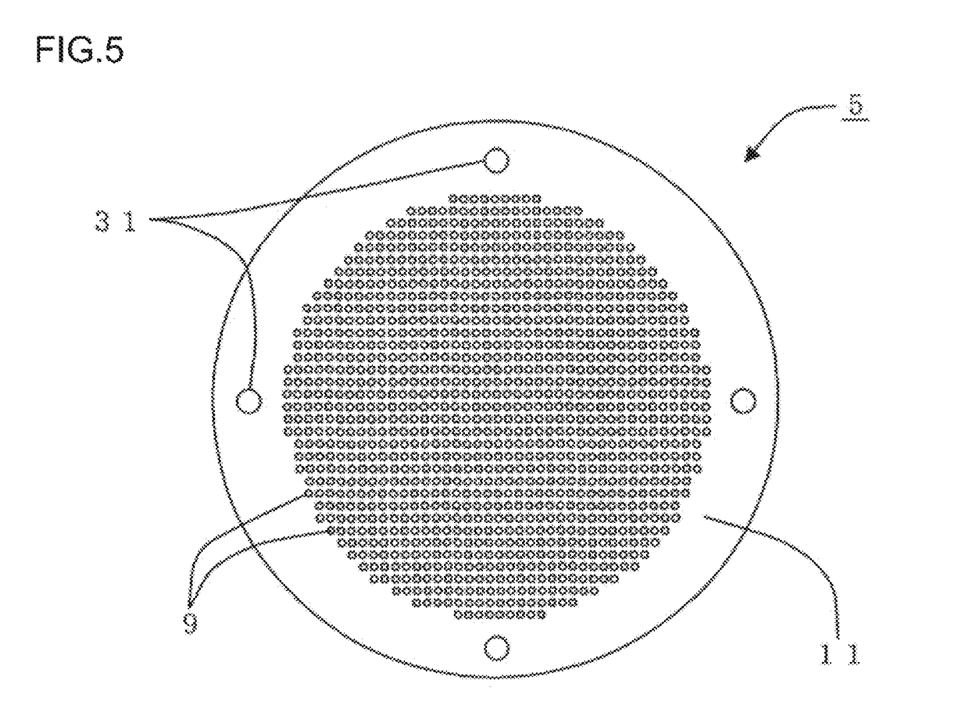
FIG. 5 is a plan view schematically showing the back plate of the embodiment of the die for forming the honeycomb structure of the present invention.

There is not any special restriction on the outer peripheral shape and size of the back plate 5, but the outer peripheral shape and size are preferably the same as those of the die main body 4. For example, as shown in FIG. 5, the back plate is preferably round. Here, FIG. 5 is a plan view schematically showing the back plate of the embodiment of the die for forming the honeycomb structure of the present invention.

There is not any special restriction on the material of the back plate 5, but a stainless steel, a tool steel, a hard metal or the like is preferably used.

All the through holes 9 formed in the back plate 5 preferably have a substantially equal hole diameter (excluding the through hole opening portions). Here, "the substantially equal hole diameter" indicates that the hole diameters of the plurality of through holes are in a range of ±10% with respect to the average value of the hole diameters. Moreover, "the hole diameter" is the longest diameter of the sectional shape of the through hole parallel to the surface of the back plate. For example, the hole diameter of a round through hole is a diameter, that of an elliptic through hole is a longer diameter, and that of a through hole having a polygonal shape such as a square shape or a rectangular shape is a diagonal line (the longest diameter). The hole diameter of the through hole 9 corresponding to a position through which the forming material for forming the outer peripheral wall of the honeycomb structure is introduced may be decreased, whereby the forming material having excessively satisfactory flow properties can also form the honeycomb structure having desired outer peripheral wall thicknesses and partition wall thicknesses. Moreover, the hole diameters of the through holes 9 are preferably equal to or 20 to 100 μm larger than those of the corresponding (communicating) back holes 7 of the introducing portion 3.

There is not any special restriction on a region (an arrangement region) where the plurality of through holes 9 formed in the back plate 5 are arranged, and the region can appropriately be determined in accordance with the back holes 7 of the introducing portion 3. For example, the shape of the arrangement region of the through holes 9 is preferably the round shape shown in FIG. 5, or a polygonal shape such as a quadrangular shape. Moreover, the back holes 7 may meet the back hole positions of the die main body 4, and in FIG. 5, the back holes 7 are linearly aligned, but the present invention is not limited to this arrangement, and the back holes may be arranged in, for example, a zigzag pattern or a concentric pattern.

In the die main body 4 of the honeycomb structure forming die 1 of the present embodiment, the forming portion 2 and the introducing portion 3 may integrally be formed. Moreover, the forming portion 2, and the introducing portion 3 may be made of different members, respectively, and these two types of members (the members may be two members of the same materials) may be joined to each other by use of a binding material. Moreover, the back plate 5 is preferably detachably attached to the introducing portion 3 by bolt fastening, pin fitting or the like. In the case of the bolt fastening, as shown in FIG. 5, the outer edge portion of the back plate 5 is preferably provided with holes 31 through which bolts are passed.

The die main body 4 has a plate-like shape, but there is not any special restriction on the outer peripheral shape of the die main body, and the outer peripheral shape thereof can appropriately be determined in accordance with the shape of the tip of the extruder to which the die is attached. Examples of the shape include a round shape, an elliptic shape and a quadrangular shape. This outer peripheral shape corresponds to that of the forming portion 2 or the introducing portion 3.

There is not any special restriction on the size of the die main body 4, but the size can appropriately be determined in accordance with the size of the honeycomb structure to be formed. For example, a disc-like die main body having a diameter of 150 to 600 mm and a thickness of 10 to 100 mm can preferably be used.

There is not any special restriction on the thickness of the forming portion 2 of the die main body 4 (the length of the forming portion in the flow direction of the forming material), but the thickness is preferably from 1 to 7 mm in respect of the forming properties of the honeycomb structure or the like.

Examples of the material of the forming portion 2 include a stainless steel, a tool steel and a hard metal.

The slits 6 formed in the forming portion 2 are preferably formed in a lattice-like pattern, and as a lattice shape, a quadrangular shape, a hexagonal shape or another polygonal shape is preferable. There is not any special restriction on the width of each slit 6 and a space between the adjacent slits 6, and they can appropriately be determined in accordance with the partition wall thicknesses and cell sizes of the honeycomb structure to be formed. The width of the slit is, for example, preferably from about 0.05 to 0.4 mm, and the space between the adjacent slits is preferably from about 0.6 to 2.5 mm.

There is not any special restriction on the shape of the arrangement region of the slits 6 in the surface of the forming portion 2, and the shape can appropriately be determined in accordance with the shape of the honeycomb structure to be formed. Examples of the shape include a round shape, an elliptic shape, a quadrangular shape, a hexagonal shape and another polygonal shape.

Moreover, there is not any special restriction on the thickness of the introducing portion 3 of the honeycomb structure forming die 1 of the present embodiment, but the thickness is preferably from 10 to 100 mm in respect of strength and pressure loss.

Examples of the material of the introducing portion 3 include a stainless steel, a tool steel and a hard metal.

There is not any special restriction on the shape of the cross section of the back hole 7 formed in the introducing portion 3 in parallel with the introduction surface 8, and the shape can appropriately be determined in accordance with the ease of processing, the ease of the flowing of the forming material or the like. Examples of the shape include a round shape, an elliptic shape and a polygonal shape such as a quadrangular shape.

Moreover, there is not any special restriction on the arrangement positions of the back holes 7, but the back holes are preferably formed so as to communicate with the intersecting positions of the slits 6 formed in the lattice-like pattern, and the center of each back hole 7 is further preferably disposed at the intersecting position of the slits 6. There is not any special restriction on the hole diameter of the back hole 7 (the diameter of the cross section of the back hole parallel to the introduction surface 8) and a distance between the adjacent back holes 7, and they can appropriately be determined in accordance with the widths, forming positions and the like of the slits 6. For example, when the sectional shape of the back hole is round, the hole diameter thereof is preferably from about 0.50 to 2.50 mm. Moreover, there is not any special restriction on the shape of the arrangement region of the back holes 7 formed in the introducing portion 3 (the outer peripheral shape of the region), but the shape is preferably similar to that of the arrangement region of the slits 6.

Next, a manufacturing method of the embodiment of the die for forming the honeycomb structure of the present invention will be described. First, in one surface of a plate-like member having two surfaces, back holes are formed through which a forming material for forming the honeycomb structure is to be introduced, and in the other surface of this die base member, slits connected to the back holes are formed, thereby obtaining the die base member provided with the slits. Next, in the obtained die base member provided with the slits, on at least a part of portions in which the back holes and the slits are formed, wear-resistant surface layers are formed by a process including electroless plating or CVD, whereby a die main body of the die for forming the honeycomb structure of the present embodiment is obtained.

The shapes, sizes and the like of the slits and back holes are preferably similar to those in the embodiment of the die for forming the honeycomb structure of the present invention.

Moreover, the outer edge portion of the die main body on a forming portion side may be depressed by grinding or the like. In this case, as to the shape of the die for forming the honeycomb structure, the outer edge portion of the forming portion is depressed by the grinding or the like, and hence becomes thin. In consequence, as shown in FIG. 2, when the die for forming the honeycomb structure is attached to the extruder to form the honeycomb structure, the dimension of a formed article can be regulated by the opening diameter of the masking plate 21, and hence the honeycomb structure having a hardly deformed outer peripheral shape can easily be obtained.

Next, a back plate is prepared. To prepare the back plate, first in a plate-like member (the plate-like member for the back plate), through holes having the same positions and sizes (hole diameters) as those of the back holes formed in the introducing portion are formed. The thickness, outer peripheral shape and the like of the plate-like member for the back plate are preferably similar to those of the back plate in the embodiment of the die for forming the honeycomb structure of the present invention. The through holes can be formed by laser processing, drill processing, electrolytic processing or the like.

Next, as shown in FIGS. 3, 4, the opening portions of the through holes 9 on a back plate introduction surface 10 side (through hole opening portions 12) are processed into an enlarging shape. The processing can be performed by mechanical processing or electrolytic processing. The enlarging shape is preferably the same as the preferable enlarging shape of each through hole of the back plate of the die for forming the honeycomb structure of the present embodiment. When the through holes 9 are formed by the drill processing, "centering" by a center drill prior to the drill processing is performed deeper than usual, whereby the through hole opening portions 12 having a preferable enlarging shape are formed, and then the through holes 9 may be formed. The surface of the back plate is preferably ground to decrease the surface roughness thereof. Moreover, after the grind processing, a sand blast treatment or the like can be performed to regulate the surface roughness.

Next, on one surface of the back plate (the back plate introduction surface), a DLC film is formed. The film thickness of the DLC film is preferably the preferable film thickness of the DLC film in the embodiment of the die for forming the honeycomb structure of the present invention. As a film forming method, a plasma CVD method or a sputtering method may be used. The plasma CVD method is a method in which a chemical reaction such as the decomposition, bond or the like of a material gas in a low-pressure environment is caused by using the energy of plasmas generated in a vacuum container by use of a high-frequency power, a direct-current power, a direct-current pulse power or the like to form a thin film on the surface of the back plate heated at 100 to 300° C. The sputtering method is a method of ionizing an inactive gas of argon or the like in the low-pressure environment by use of an electric field or the like in the vacuum container and accelerating the resultant ions to drive the ions in a target material, whereby flicked atoms are deposited on the surface of the facing back plate to form the thin film. At this time, a gas of hydrogen, an alkyl compound or the like may be mixed during sputtering. In the plasma CVD method, as the material gas, the alkyl compound or the like may be used. Moreover, in the sputtering method, carbon or the like may be used as the target material.

Next, the back plate is detachably attached to the obtained die main body on the introducing portion side by screw clamping, pin fitting or the like, whereby the die for forming the honeycomb structure of the present embodiment can be obtained. At this time, as shown in FIG. 1, the back plate 5 is preferably attached so that the back holes 7 formed in the back plate 5 have the same positions as those of the back holes 7 formed in the introducing portion 3. Moreover, the back plate 5 is attached to the die main body so that the surface of the back plate 5 provided with the DLC film 11 (the back plate introduction surface 10) faces the forming material introduction side and so that the surface of the back plate which is not provided with the DLC film 11 faces the introducing portion 3 side.

EXAMPLES

Hereinafter, the present invention will further specifically be described with respect to examples, but the present invention is not limited to these examples.

Example 1

First, in one surface of a plate-like member having two surfaces, back holes each having a round cross section were formed through which a forming material for forming a honeycomb structure was to be introduced, and in the other surface of this die base member, slits connected to the back holes were formed in a lattice-like pattern to obtain the die base member provided with the slits. In the obtained die base member provided with the slits, on portions in which the back holes and the slits were formed, wear-resistant surface layers were formed by electroless plating and a CVD method, whereby a die main body was obtained. The material of the wear-resistant surface layer on the outermost surface of the die main body was a $W_3C$ film. The thickness of an introducing portion provided with the back holes was 15 mm, and the thickness of a forming portion provided with the slits was 3 mm. Moreover, the diameter of each back hole was 1.3 mm, and the pitch of the back holes was 1.4 mm. Moreover, the width of each slit was 0.12 mm, and the lattice-like slits were formed so that the back holes were positioned at intersections having a lattice-like shape. The slits were formed by grind processing. The back holes were formed by drill processing.

Next, a back plate was prepared. To prepare the back plate, first in a plate-like member (the plate-like member for the back plate), through holes having the same positions and sizes (hole diameters) as those of the back holes formed in the introducing portion were formed. The through holes were formed by drill processing. The thickness of the plate-like member for the back plate was 2 mm, and the outer peripheral shape thereof was a round shape.

Next, as shown in FIGS. 3, 4, the opening portions of the through holes on a back plate introduction surface side (the through hole opening portions) were processed into an enlarging shape. The processing was performed by mechanical processing by use of a center drill. As the enlarging shape, an acute angle θ formed by a through hole opening surface 14 of a through hole opening portion 12 and a plane parallel to a back plate introduction surface 10 was 30°, a depth D of the through hole opening portion 12 having the enlarging shape was 290 μm, and a depth T between the back plate introduction surface and the center of a contact portion 15 of outermost peripheral portions 13 of through hole opening portions 12 of adjacent through holes 9 was 50 μm. Furthermore, the through hole opening surface 14 of the through hole opening portion 12 was linear in the cross section thereof parallel to a through hole extending direction (the circulating direction of the forming material).

The surface of the back plate was ground, and after the grind processing, a sand blast treatment was performed.

Next, on one surface of the back plate (the back plate introduction surface), a DLC film was prepared. The DLC film was prepared by using an acetylene material by a direct-current pulse plasma CVD method. The film thickness of the DLC film was 2.5 μm.

Next, the back plate was attached to the introducing portion side of the obtained die main body by pin fitting to obtain the die for forming the honeycomb structure. At this time, the back plate was attached so that the back holes formed in the back plate had the same positions as those of the back holes formed in the introducing portion. The surface roughness (μmRa) of the enlarged portions of the through hole opening portions was measured by the method of JIS B601. Results are shown in Table 1.

As to the obtained die for forming the honeycomb structure, a honeycomb structure forming test and the measurement of a forming pressure were performed by methods as follows. Results are shown in Table 1. In Table 1, the columns of "hangnails" and pores indicate the ratios of honeycomb structures in which "the hangnails" and the pores are generated among 2,000 honeycomb structures.

(Honeycomb Structure Forming Test)

As ceramic materials, alumina, talc and kaolin were used, these materials were mixed with an organic binder, and water was added thereto, followed by kneading, whereby a clay (a forming material) was prepared by a vacuum clay kneader. The obtained clay was formed by an extruder to which the die for forming the honeycomb structure was attached, thereby obtaining a cylindrically formed honeycomb article. A forming speed was 45 mm/s. The resultant formed honeycomb article was dried by using a dielectric drier, and then fired by using a tunnel type firing furnace, to obtain the honeycomb structure. By the above method, 2,000 honeycomb structures were prepared. As to the obtained honeycomb structures, "the hangnails" and the pores in the outer peripheral walls of the structures were observed. Moreover, the honeycomb structures having appearance defects or dimensions below standard were regarded as defective products, and the yield of the manufacturing of satisfactory products was calculated. As to an appearance, in a case where the surface of the honeycomb structure had a smooth state, it was judged that the structure had a satisfactory appearance. In a case where a dent, a streak or the like was formed and the surface of the structure was not smooth, it was judged that the structure had the appearance defect. In the case of the appearance defect, it was judged that the honeycomb structure was a defective product. In Table 2, the ratio of the number of the appearance defects in the whole prepared honeycomb structure is indicated as "an appearance defect ratio".

(Measurement of Forming Pressure)

A forming pressure was measured by a plunger oil pressure meter attached to an injection type extruder.

TABLE 1

|  | Yield (%) | Hangnail (%) | Pore (%) | Forming pressure (Pa) | Surface roughness (μmRa) | Appearance defect ratio (%) |
|---|---|---|---|---|---|---|
| Example 1 | 99.11 | 0.12 | 0.03 | $120 \times 10^5$ | 1.1 | 0.00 |
| Comparative Example 1 | 98.74 | 0.33 | 0.12 | $140 \times 10^5$ | — | 0.35 |

Examples 2 to 7

Dies for forming honeycomb structures were prepared in the same manner as in Example 1 except that the surface roughness of an enlarged portion of each through hole opening portion having an enlarging shape in a back plate introduction surface was varied as shown in Table 2. In the same manner as in Example 1, a honeycomb structure forming test was performed, and forming pressures were measured. Moreover, hangnails, pores and appearance defects were observed, and yields were calculated. Results are shown in Table 2.

TABLE 2

|  | Surface roughness (μmRa) | Yield (%) | Hangnail (%) | Pore (%) | Appearance defect ratio (%) | Forming pressure (Pa) |
|---|---|---|---|---|---|---|
| Example 2 | 0.005 | 98.89 | 0.10 | 0.03 | 0.05 | $117 \times 10^5$ |
| Example 3 | 0.01 | 99.05 | 0.10 | 0.02 | 0.00 | $117 \times 10^5$ |
| Example 4 | 0.3 | 99.08 | 0.12 | 0.03 | 0.00 | $118 \times 10^5$ |
| Example 1 | 1.1 | 99.11 | 0.12 | 0.03 | 0.00 | $120 \times 10^5$ |
| Example 5 | 2.5 | 99.15 | 0.11 | 0.03 | 0.00 | $122 \times 10^5$ |
| Example 6 | 5.0 | 99.06 | 0.12 | 0.04 | 0.02 | $125 \times 10^5$ |
| Example 7 | 7.5 | 98.80 | 0.05 | 0.04 | 0.15 | $133 \times 10^5$ |

Examples 8 to 12

Dies for forming honeycomb structures were prepared in the same manner as in Example 1 except that a depth T between a back plate introduction surface and the center of a contact portion 15 of outermost peripheral portions 13 of through hole opening portions 12 of adjacent through holes 9 was varied as shown in Table 3. In the same manner as in Example 1, a honeycomb structure forming test was performed, and forming pressures were measured. Moreover, hangnails, pores and appearance defects were observed, and yields were calculated. Results are shown in Table 3.

TABLE 3

|  | Depth T (mm) | Yield (%) | Hangnail (%) | Pore (%) | Appearance defect ratio (%) | Forming pressure (Pa) |
|---|---|---|---|---|---|---|
| Example 8 | 0.02 | 98.86 | 0.30 | 0.10 | 0.00 | $135 \times 10^5$ |
| Example 9 | 0.05 | 99.11 | 0.12 | 0.03 | 0.00 | $120 \times 10^5$ |
| Example 10 | 0.10 | 99.13 | 0.10 | 0.03 | 0.03 | $118 \times 10^5$ |
| Example 11 | 0.15 | 98.84 | 0.05 | 0.02 | 0.15 | $116 \times 10^5$ |
| Example 12 | 0.20 | 96.50 | 0.04 | 0.02 | 0.20 | $113 \times 10^5$ |

Comparative Example 1

A die for forming a honeycomb structure was prepared in the same manner as in Example 1 except that opening portions of through holes on a back plate introduction surface side (the through hole opening portions) were not processed into an enlarging shape. In the same manner as in Example 1, a honeycomb structure forming test was performed, and a forming pressure was measured. Moreover, hangnails, pores and appearance defects were observed, and a yield was calculated. Results are shown in Table 1.

It is seen from Table 1 that the die for forming the honeycomb structure of Example 1 has a better yield and the generation of less hangnail and less pores as compared with the die for forming the honeycomb structure of Comparative Example 1. It is also seen that the die for forming the honeycomb structure of Example 1 has a smaller forming pressure as compared with the die for forming the honeycomb structure of Comparative Example 1.

The die for forming the honeycomb structure of the present invention can be utilized for the extrusion of the ceramic honeycomb structure.

DESCRIPTION OF REFERENCE NUMERALS

1: honeycomb structure forming die, 2: forming portion, 3: introducing portion, 4: die main body, 5: back plate, 6: slit, 7: back hole, 8: introduction surface, 9: through hole, 10: back plate introduction surface, 11: DLC film, 12: through hole opening portion, 13: outermost peripheral portion, 14: through hole opening surface, 15: a contact portion of outermost peripheral portions, 21: masking plate, 22: regulation ring, 23: spacer, 31: bolt passing hole, A: forming material flow direction, A1: lateral flow, θ: angle, D: depth, and T: depth.

What is claimed is:

1. A die for forming a honeycomb structure, comprising:
a plate-like die main body having an introducing portion provided on a side of a first surface thereof and having a plurality of back holes extending in a thickness direction to introduce a forming material, and a forming portion provided on a side opposite to the first surface thereof and having slits connected to the back holes to form the forming material into a honeycomb shape; and
a back plate removably attached to the surface of the introducing portion and having a plurality of through holes connected to the back holes of the introducing portion, wherein the opening portions of the through holes formed in an introduction surface of the back plate, which does not contact the first surface of the die main body, have an enlarging shape so as to enlarge toward the introduction surface, and wherein the outermost peripheral portions of the opening portions of all adjacent through holes are in contact with each other.

2. The die for forming the honeycomb structure according to claim 1, wherein the enlarged portions of the opening portions of the through holes having the enlarging shape have a surface roughness, Ra, of 0.005 to 5 μm.

3. The die for forming the honeycomb structure according to claim 1, wherein a depth between the surface of the back plate which does not come in contact with the first surface of the die main body and the center portion of the outermost peripheral portions of the opening portions of the adjacent through holes is from 20 to 150 μm.

4. The die for forming the honeycomb structure according to claim 2, wherein a depth between the surface of the back plate which does not come in contact with the first surface of the die main body and the center portion of the outermost peripheral portions of the opening portions of the adjacent through holes is from 20 to 150 μm.

5. The die for forming the honeycomb structure according to claim 1, wherein the introduction surface of the back plate has a diamond-like carbon film.

6. The die for forming the honeycomb structure according to claim 2, wherein the introduction surface of the back plate has a diamond-like carbon film.

7. The die for forming the honeycomb structure according to claim 3, wherein the introduction surface of the back plate has a diamond-like carbon film.

8. The die for forming the honeycomb structure according to claim 1, wherein the back plate is removably attached to the surface of the introducing portion of the plate-like die main body via pin fittings.

9. The die for forming the honeycomb structure according to claim 1, wherein the back plate is removably attached to the surface of the introducing portion of the plate-like die main body via fastening bolts.

* * * * *